US012777026B1

(12) United States Patent
Narayanaswamy et al.

(10) Patent No.: US 12,777,026 B1
(45) Date of Patent: Oct. 27, 2026

(54) REAL-TIME SECURITY ASSISTANT FOR UNIFIED COMMUNICATIONS AS A SERVICE (UCAAS)

(71) Applicant: Netskope, Inc, Santa Clara, CA (US)

(72) Inventors: Krishna Narayanaswamy, Saratoga, CA (US); Siying Yang, Saratoga, CA (US)

(73) Assignee: Netskope, inc., Santa Clara, CA (US)

( * ) Notice: Subject to any disclaimer, the term of this patent is extended or adjusted under 35 U.S.C. 154(b) by 0 days.

(21) Appl. No.: 19/397,605

(22) Filed: Nov. 21, 2025

Related U.S. Application Data

(60) Provisional application No. 63/797,063, filed on Apr. 29, 2025.

(51) Int. Cl.
*H04L 29/06* (2006.01)
*H04L 9/40* (2022.01)

(52) U.S. Cl.
CPC ........ *H04L 63/0457* (2013.01); *H04L 63/166* (2013.01)

(58) Field of Classification Search
CPC ... H04L 63/0457; H04L 63/16; H04L 63/166; H04L 9/3231; H04L 63/0861;
(Continued)

(56) References Cited

U.S. PATENT DOCUMENTS

| | | | |
|---|---|---|---|
| 11,687,778 | B2 | 6/2023 | Ciftci et al. |
| 12,175,571 | B2 | 12/2024 | Astarabadi et al. |

(Continued)

FOREIGN PATENT DOCUMENTS

| | | | |
|---|---|---|---|
| CN | 113326400 | A | 8/2021 |
| CN | 116310937 | A | 6/2023 |

(Continued)

OTHER PUBLICATIONS

Alrashoud, Mubarak, "Deepfake video detection methods, approaches, and challenges," Alexandria Engineering Journal, Elsevier B.B. on behalf of Faculty of Engineering, Alexandria University, 2025, vol. 125, pp. 265-277.

(Continued)

*Primary Examiner* — Tri M Tran
(74) *Attorney, Agent, or Firm* — MUGHAL GAUDRY & FRANKLIN PC

(57) ABSTRACT

A method for providing real-time security assistance for Unified Communications as a Service (UCaaS) implementing a Security Service Edge (SSE) as an inline forward proxy is disclosed. The method includes performing real-time communications between several end-users using an electronic agent. The SSE is implemented at a mid-link server between several end-user devices and a web server associated with the electronic agent. The method further includes implementing the SSE as the inline forward proxy at several end-user devices to detect any deep-fake video and audio streams during real-time communications. The method further includes intercepting and decrypting traffic associated with the real-time communications to access original video and audio streams from real-time communications. Further, the method includes applying, in real-time, several policies on the deep-fake video and audio streams detected using the SSE.

20 Claims, 11 Drawing Sheets

(58) Field of Classification Search

CPC ...... G06F 21/32; G06F 11/30; G06F 63/0457; G06F 21/31; G06F 3/017; G06V 40/45; G06V 20/46

See application file for complete search history.

(56) References Cited

U.S. PATENT DOCUMENTS

| | | | |
|---|---|---|---|
| 12,445,307 B1 * | 10/2025 | Suter | G06T 7/20 |
| 2024/0348603 A1 * | 10/2024 | Tussy | G06V 40/167 |
| 2025/0037507 A1 | 1/2025 | Chen et al. | |
| 2025/0112988 A1 | 4/2025 | Mirsky | |
| 2026/0006131 A1 * | 1/2026 | Rocha, III | H04M 3/5315 |

FOREIGN PATENT DOCUMENTS

| | | | |
|---|---|---|---|
| CN | 116645733 | A | 8/2023 |
| CN | 117115627 | A | 11/2023 |
| CN | 117197867 | A | 12/2023 |
| CN | 119091350 | A | 12/2024 |
| CN | 119992421 | A | 5/2025 |
| CN | 120496194 | A | 8/2025 |
| WO | 2024097701 | A1 | 5/2024 |
| WO | 2024243113 | A1 | 11/2024 |

OTHER PUBLICATIONS

Intel Labs, "Trusted Media: Real-Time FakeCatcher for Deepfake Detection," Oct. 11, 2025, 14:11, accessed on Nov. 25 at https://www.intel.com/content/www/us/en/research/trusted-media-deepfake-detection.htmi, 2 pgs.

McAfee, "McAfee Deepfake Detector flags AI-generated audio within seconds," Deepfake Detector: McAfee Deepfake Detection for AI Audio and Video, Oct. 11, 2025, 14:17, accessed Nov. 25, 2025 at https://www.mcafee.com/ai/deepfake-detector/, 6 pgs.

Resemble AI, "Resemble AI: The Voice AI Platform," AI Voice Generator and Deepfake Detection for Enterprise, Oct. 11, 2025, 14:12, accessed Nov. 25 at https://www.resemble.ai/, 9 pgs.

Sensity, "All-In-One Deepfake Detection," Sensity AI: Best Deepfake Detection Software in 2025, Oct. 11, 2025, 14:16, accessed Nov. 25, 2025 at https://sensity.ai/, 11 pgs.

* cited by examiner

REAL-TIME SECURITY ASSISTANT FOR UNIFIED COMMUNICATIONS AS A SERVICE (UCAAS)

PRIORITY

This application is non-provisional of and claims priority to U.S. Provisional Patent Application No. 63/797,063, filed, Apr. 29, 2025, the contents of which are hereby incorporated by reference in their entirety for all purposes.

BACKGROUND

This disclosure generally relates to detecting deep-fake media, and, by way of example, to detecting deep-fake video and audio in Unified Communications as a Service (UCaaS) applications, among other things.

UCaaS applications enable online communication through video, audio, and text. With the advancement of Artificial Intelligence (AI) technologies, deep fakes have become a serious threat, allowing attackers to impersonate meeting participants by manipulating video and audio in real time. The attackers communicate in online meetings and obtain confidential information from the meeting participants. Spoofing humans using AI can also extend to video calls, phone calls, and various media.

SUMMARY

In one embodiment, the present disclosure provides a method for providing real-time security assistance for Unified Communications as a Service (UCaaS) implementing a Security Service Edge (SSE) as an inline forward proxy is disclosed. The method includes performing real-time communications between several end-users using an electronic agent. The SSE is implemented at a mid-link server between the several end-user devices and a web server associated with the electronic agent. The method further includes implementing the SSE as the inline forward proxy at several end-user devices to detect any deep-fake video and audio streams during real-time communications. The method further includes intercepting and decrypting traffic associated with the real-time communications to access original video and audio streams from real-time communications. Further, the method includes applying, in real-time, several policies on the deep-fake video and audio streams detected using the SSE. Some embodiments would provide the SSE an application programming interface (API) to send the audio and/or video in real-time or near real-time for deep fake detection where notifications could be sent as soon as possible to the participants in the UCaaS session.

In an embodiment, a method for providing the real-time security assistance for the UCaaS implementing the SSE as the inline forward proxy is disclosed. The method includes performing real-time communications between the several end-users using the electronic agent. The SSE is implemented at the mid-link server between several end-user devices and a web server associated with the electronic agent. The method further includes implementing the SSE as the inline forward proxy at the several end-user devices or with an API collecting from the Ucaas for the SSE to detect the deep-fake video and audio streams during the real-time communications. The method further includes intercepting and decrypting traffic associated with the real-time communications to access original video and audio streams from real-time communications. The method further includes applying, in real-time, the several policies on the deep-fake video and audio streams detected using the SSE.

In another embodiment, a method for providing the real-time security assistance for the UCaaS through a UCaaS bot component is disclosed. The method includes performing real-time communications between the several end-users using the electronic agent. The SSE is implemented at the mid-link server between the several end-user devices and the web server associated with the electronic agent. The method further includes implementing the SSE as the inline forward proxy at the several end-user devices. The SSE includes the UCaaS bot component to access the electronic agent and retrieve original video and audio streams from the real-time communications. The method further includes detecting the deep-fake video and audio streams using the SSE via the UCaaS bot component. The method further includes providing alerts for the deep-fake video and audio streams to end-users associated with the electronic agent.

In another embodiment, real-time security assistant system for UCaaS implementing a SSE as the inline forward proxy is disclosed. The system includes several processors. The system further includes a memory coupled with the processors. The memory stores instructions that, when executed by the processors, cause the processors to perform real-time communications between the several end-users using the electronic agent. The SSE is implemented at the mid-link server between the several end-user devices and the web server associated with the electronic agent. The memory stores instructions that, when executed by the processors, further cause the processors to implement the SSE as the inline forward proxy at the several end-user devices to detect the deep-fake video and audio streams during the real-time communications. The memory stores instructions that, when executed by the processors, further cause the processors to intercept and decrypt traffic associated with the real-time communications to access original video and audio streams from the real-time communications. The memory stores instructions that, when executed by the processors further cause the processors to apply, in real-time, the several policies on the deep-fake video and audio streams detected using the SSE.

In yet another embodiment, a non-transitory computer-readable storage medium having stored thereon instructions for causing one computer to execute a method for providing the real-time security assistance for the UCaaS implementing the SSE as the inline forward proxy, the method including:

- performing real-time communications between the several end-users using the electronic agent, wherein the SSE is implemented at the mid-link server between the several end-user devices and the web server associated with the electronic agent;
- implementing the SSE as the inline forward proxy at the several end-user devices to detect the deep-fake video and audio streams during real-time communications;
- intercepting and decrypting traffic associated with real-time communications to access original video and audio streams from real-time communications; and
- applying, in real-time, several policies on the deep-fake video and audio streams detected using the SSE.

The term embodiment and like terms are intended to refer broadly to all the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label with a second alphabetical label that distinguishes among the similar components. If only the first reference label is used in the specification, the description applies to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

A Unified Communications as a Service (UCaaS) vendors enable people from different locations to communicate online with video, audio, and text chat support. Representative vendors include Zoom™, Microsoft™ Teams, Cisco™ WebEx™, Google™ Meet, and RingCentral™, for example.

With the advancement of AI technologies, deep fakes have become a serious threat to UCaaS applications. With the deep-fakes, attackers manipulate a person's video and audio to impersonate online meeting attendees. In other words, if UCaaS provider has been compromised, malicious attackers impersonate colleagues and friends to communicate with you in online meetings to obtain confidential information from you. Detection of deep-fake video and audio has become non-negotiable in real-time online meetings, similar to the offline detection of deep-fake videos and audios in hosted content platforms, such as YouTube™.

While deep-fake audio and video detection solutions have existed for content hosting platforms, like YouTube™, for a while, these solutions work in an "offline" manner. Given a video or audio file as an input, these solutions scan the input and determine whether the input is deep-fake or not. There is no awareness on any viable real-time deep-fake detection solutions for UCaaS applications to prevent deep-fakes while an online meeting is in progress.

Figure 1:
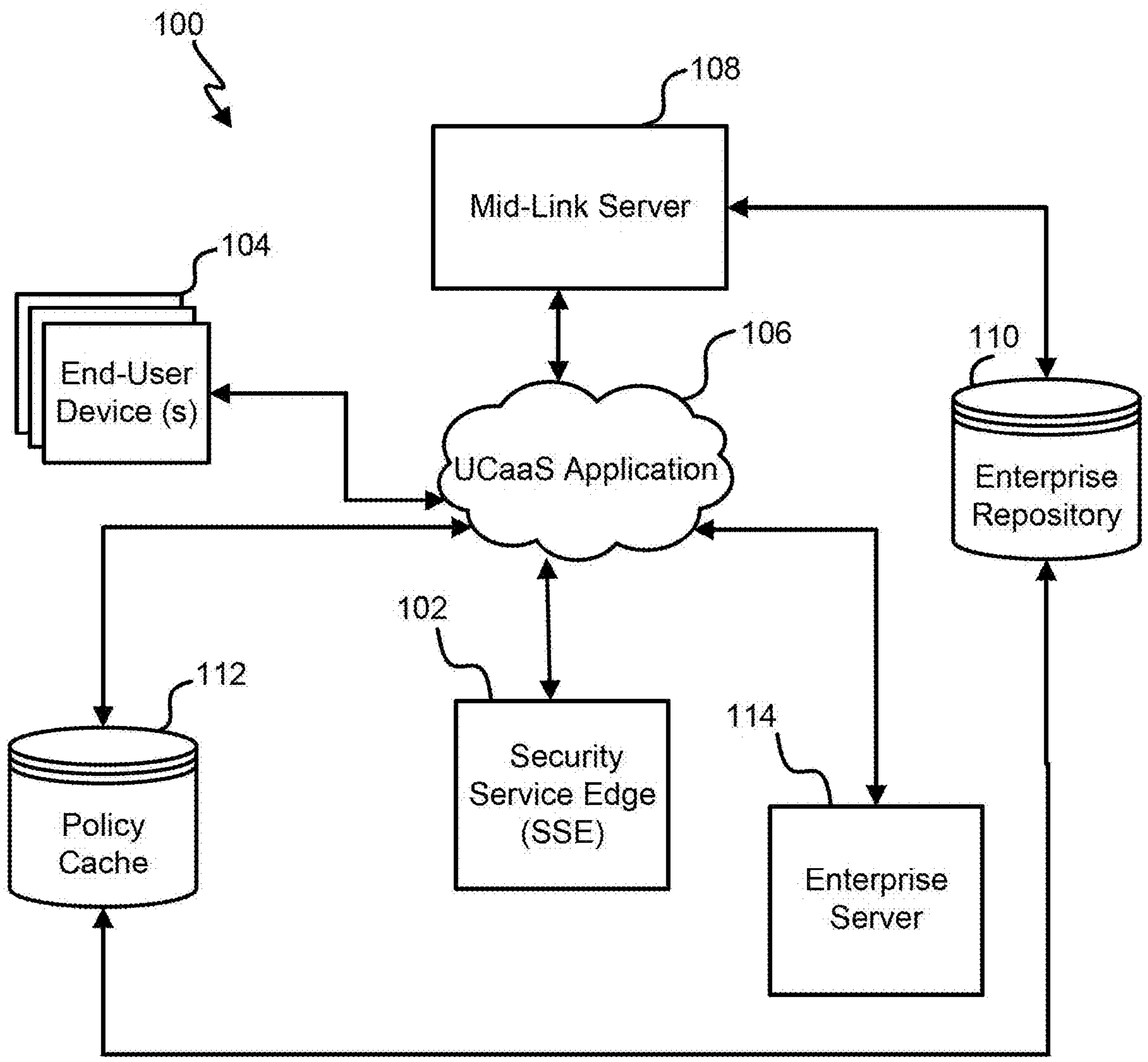
FIG. 1 illustrates a block diagram of a real-time security assistant system for a Unified Communications as a Service (UCaaS) using a Security Service Edge (SSE).

Referring to FIG. 1, a block diagram of a real-time security assistant system 100 for the UCaaS using a Security Service Edge (SSE) is shown. The real-time security assistant system 100 for the UCaaS using the SSE detects deep-fake video and audio streams on end-user device(s) 104 of users of an enterprise during the Unified Communications as Service (UCaaS) communications. The real-time security assistant system 100 for the UCaaS using the SSE includes the SSE 102, a end-user device(s) 104, a UCaaS application 106, a mid-link server 108, an enterprise repository 110, a policy cache 112, and an enterprise server 114. The SSE 102, the end-user device(s) 104, the mid-link server 108, the enterprise repository 110, the policy cache 112, and the enterprise server 114 are communicatively coupled through the UCaaS application 106.

The end-user device(s) 104 communicate with one another in real-time communications over an electronic agent, like a UCaaS application that allows real time video and audio interaction. During such communications, audio streams, video streams, screen-sharing data, and collaboration messages are transmitted between the end-user device (s) 104 and a web server associated with the UCaaS application 106.

In some embodiments, the mid-link server 108 is positioned between the several end-user device(s) 104 and the web server of the UCaaS application 106. The SSE 102 is implemented on mid-link server 108 and operates as an inline forward proxy. In some embodiments, media traffic during the real-time communication from the UCaaS application is routed through the SSE 102. The SSE 102 identifies deep-fake video and audio streams in real-time by intercepting and decrypting traffic associated with real-time communications.

In some embodiments, the SSE 102 is used as the inline forward proxy at the end-user device(s) 104 to detect the deep-fake media (including video and/or audio streams) on the end-user device(s) 104. The SSE 102 also uses a forward Transport Layer Security (TLS) proxy to intercept and decrypt network traffic from real-time communications, thereby accessing original video and audio streams.

In some embodiments, the SSE 102 uses end-to-end encryption (E2EE) for encrypting the video and audio streams, and the SSE 102 is used with an E2EE endpoint on the end-user device(s) 104 to extract keys on the E2EE endpoint for performing decryption of the video and audio streams.

In some embodiments, the mid-link server 108 is between the end-user device(s) 104 and the enterprise server 114. The enterprise server 114 manages policies in the policy cache 112. The mid-link server 108 uses the SSE 102 as the inline forward proxy at the end-user device(s) 104 to detect the deep-fake video and audio streams during the real-time communications on the end-user device(s) 104.

The enterprise repository 110 has a list of policies associated with the deep-fake media (including video and/or audio streams) in line with the policy cache 112.

The policy cache 112 includes the list of policies defined by the enterprise using the enterprise server 114 regarding actions taken on the deep-fake audio/video streams on the end-user device(s) 104 used by the users. The policies include initiating alerts to an administrator when the deep-fake media is detected on the end-user device(s) 104 or partially or fully blocking or permitting access to the electronic agent. The policies are updated by the enterprise server 114 based on actions associated with the policies identified from the policy cache 112 and updates from the enterprise repository 110.

A policy from the list of policies from the policy cache 112 and the enterprise repository 110 is applied by the mid-link server 108 based on the detection of the deep-fake media on the end-user device(s) 104.

Figure 2:
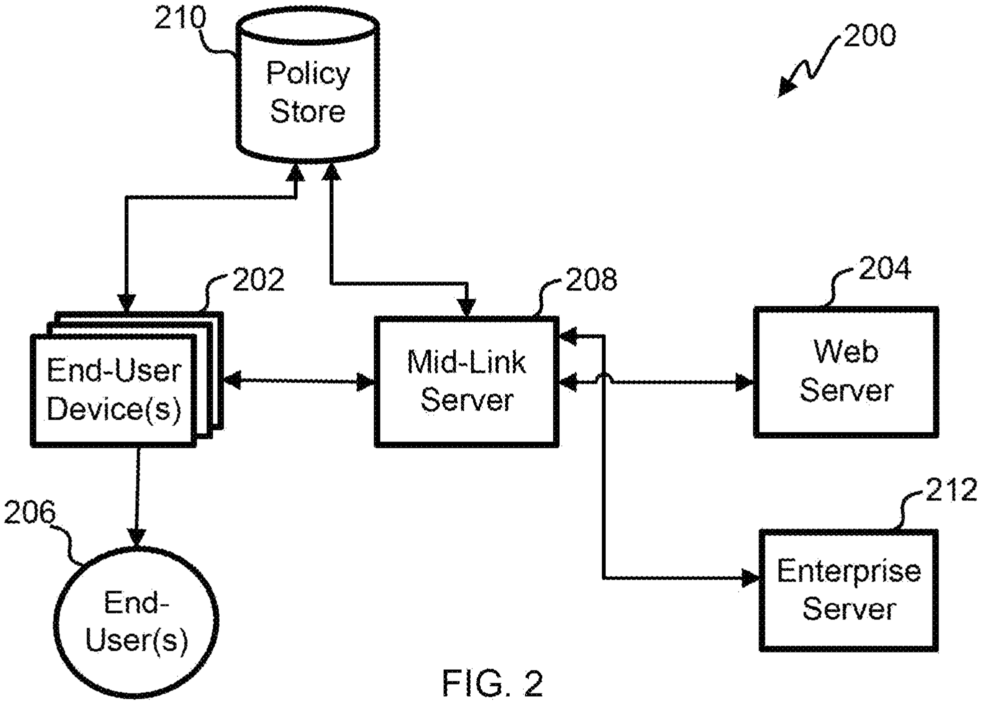
FIG. 2 illustrates a block diagram of a mid-link server that hosts end-user device(s) using a secure software environment.

Referring to FIG. 2, a block diagram of a system 200 is shown. The system 200 includes end-user device(s) 202, a web server 204, end-user(s) 206, a mid-link server 208, a policy store 210, and an enterprise server 212. The end-user device(s) 202, such as laptops, desktops, smartphones, or tablets, communicate with the web server 204 via encrypted network connections using the UCaaS application 106. The end-user device(s) 202 are monitored and secured through the mid-link server 208, which hosts a secured software environment for traffic inspection and policy enforcement.

The mid-link server 208 operates as a security and policy enforcement layer between the end-user device(s) 202 and the web server 204. The mid-link server 208 hosts the SSE 102, which functions as the inline forward proxy to intercept, decrypt, and analyze video and audio streams transmitted during UCaaS communication sessions. SSE 102 detects deep-fake audio and video streams in real time and enforces corresponding policies retrieved from the policy store 210.

The web server 204 hosts the UCaaS application 106. The web server 204 transmits and receives video and audio streams between the end-user device(s) 202 through the mid-link server 208 to allow real-time communication and deep-fake monitoring.

The policy store 210 stores a list of enterprise-defined policies associated with the detection of deep-fake media (e.g., deep-fake video and audio streams). These policies define actions, such as alerting an administrator, blocking video and audio streams, or terminating an active UCaaS session. The mid-link server 208 retrieves and applies a policy from the policy store 210 based on the detection of deep-fake media by the SSE 102.

The enterprise server 212 configures and updates the policies stored in the policy store 210. The enterprise server 212 synchronizes policy updates with mid-link server 208 to ensure that the up-to-date policies are enforced across the end-user device(s) 202.

Figure 3:
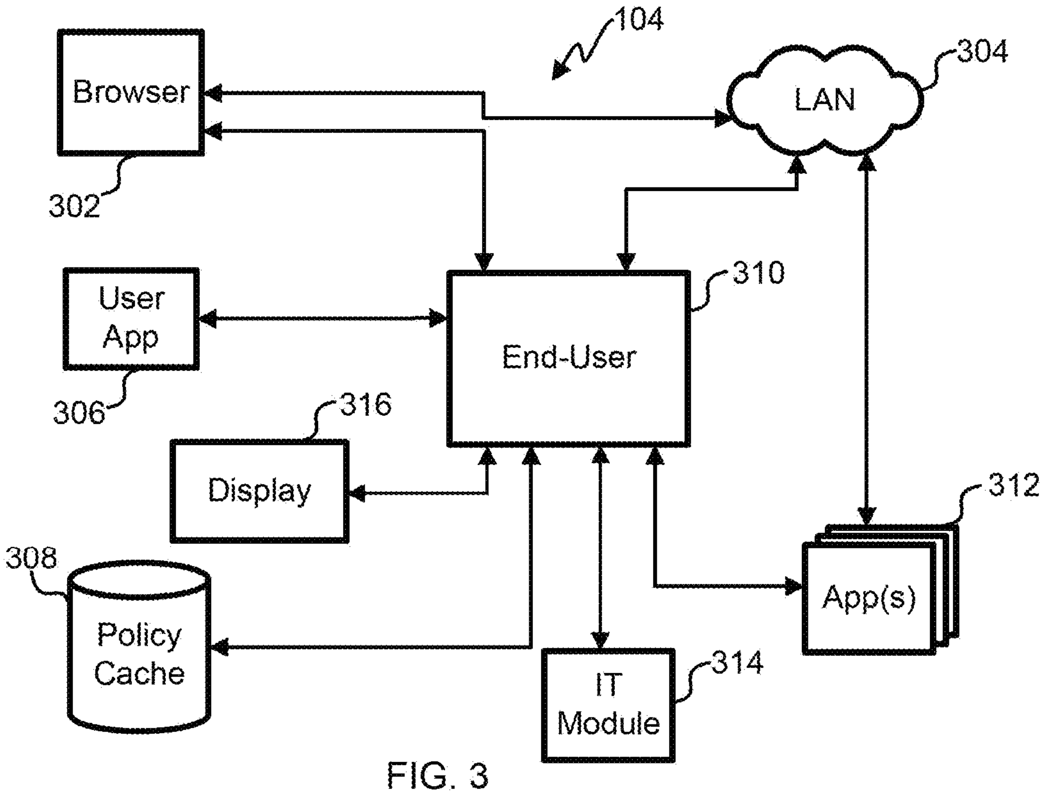
FIG. 3 illustrates a block diagram of an end-user device that uses an end-user to establish connections with the mid-link server.

Referring to FIG. 3, a block diagram of the end-user device(s) 104 communicating with the mid-link server 108 is illustrated. The end-user device(s) 104 includes a browser 302, a Local Area Network (LAN) 304, a user app 306, a policy cache 308, an end-user 310, application(s) 312, an Information Technology (IT) module 314, and a display 316. The browser 302 and the user app 306 enable the end-user 310 to initiate UCaaS sessions over the LAN 304. Traffic from browser 302 or the application(s) 312 is directed to the mid-link server 108, where the SSE 102 performs deep-fake detection and applies policies.

The user app 306 allows the end-user 310 to access real-time audio, video, messaging, and collaboration features. In some embodiments, the browser 302 is used in place of the user app 306 to establish communication sessions via Hypertext Transfer Protocol Secure (HTTPS). The traffic from browser 302 or the user app 306 is routed to the mid-link server 108.

The policy cache 308 stores copies of the list of policies that are synchronized from the policy store 210 via the mid-link server 108.

The IT module 314 monitors the activity of browser 302, the user app 306, and the application(s) 312 to ensure compliance with enterprise's list of policies. The IT module 314 reports incidents, such as detected deep-fake media or policy violations, to the enterprise server 114. The display 316 presents visual alerts, notifications, or warnings to the end-user 310 when deep-fake content is detected.

Figure 4:
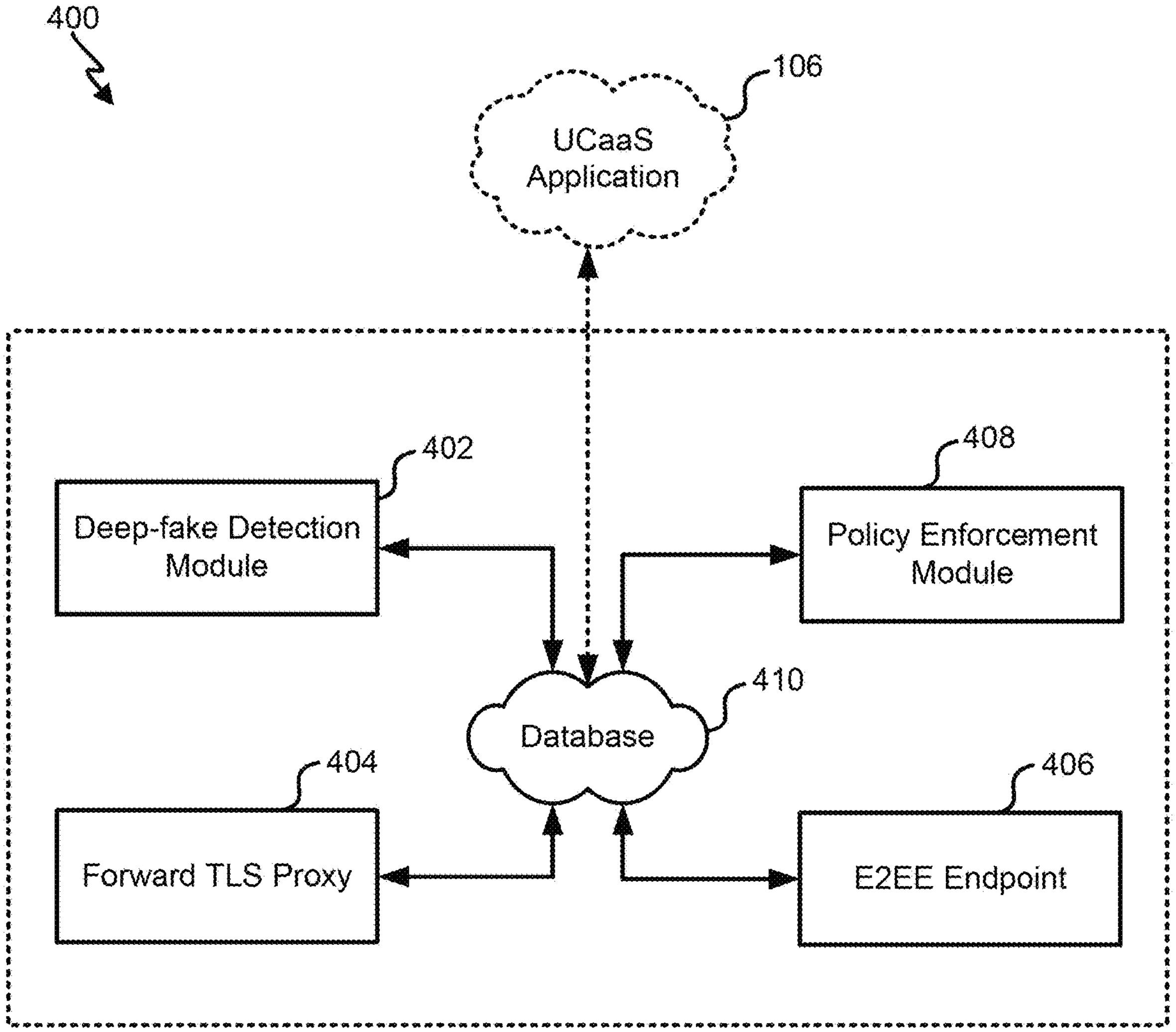
FIG. 4 illustrates a block diagram of an internal architecture of the Security Service Edge (SSE).

Referring to FIG. 4, a block diagram of an internal architecture 400 of the SSE 102 is illustrated. The SSE 102 is configured to intercept, decrypt, analyze, and enforce security policies on real-time audio and video streams during communications initiated through the UCaaS application 106. The SSE 102 includes a deep-fake detection module 402, a forward transport layer security (TLS) proxy 404, an end-to-end encryption (E2EE) endpoint 406, a policy enforcement module 408, and a database 410 communicatively coupled to one another and to the UCaaS application 106.

The deep-fake detection module 402 receives decrypted media streams from the forward TLS proxy 404 or from the E2EE endpoint 406. The deep-fake detection module 402 analyzes video frames, audio signals, or biometric features in real-time using Artificial Intelligence (AI) models or pattern recognition techniques to determine whether the received media streams contain deep-fake content (e.g., deep-fake video and audio streams).

In some embodiments, the AI models include convolutional neural networks (CNNs), recurrent neural networks (RNNs), vision transformers (ViTs), or generative adversarial network (GAN) discriminator models trained to detect visual artifacts, facial inconsistencies, or frame-level anomalies.

In some embodiments, the deep-fake detection module 402 uses spectrogram-based audio classifiers, voice anti-spoofing models, lip-sync inconsistency detection, or temporal coherence analysis to identify manipulated or synthesized speech. The detection further includes techniques, such as head pose estimation, eye-blink irregularity analysis, texture distortion mapping, or frequency-domain feature extraction, to accurately distinguish real media streams from the deep-fake content.

The forward TLS proxy 404 intercepts encrypted communication traffic between end-user device(s) 104 and the UCaaS application 106. The forward TLS proxy 404 decrypts the media streams, and forwards decrypted audio and video content to the deep-fake detection module 402 and the database 410.

In some embodiments, when E2EE is enabled in the UCaaS application 106, the SSE 102 utilizes the E2EE endpoint 406 to securely extract encryption keys from the end-user device(s) 104. The E2EE endpoint 406 forwards decrypted streams to the deep-fake detection module 402 and synchronizes with the database 410.

The policy enforcement module 408 retrieves policy instructions from the policy cache 112 and applies them upon detection of deep-fake media. The policy enforcement module 408 generate alerts, restrict media transmission, warn end-users, or terminate the UCaaS communication session, depending on the policy configured by the enterprise server 114.

The database 410 stores the decrypted media streams or frames of media streams, detected deep-fake logs, policy decisions, and encryption keys. The database 410 provides real-time data access to the deep-fake detection module 402 and policy enforcement module 408.

Figure 5:
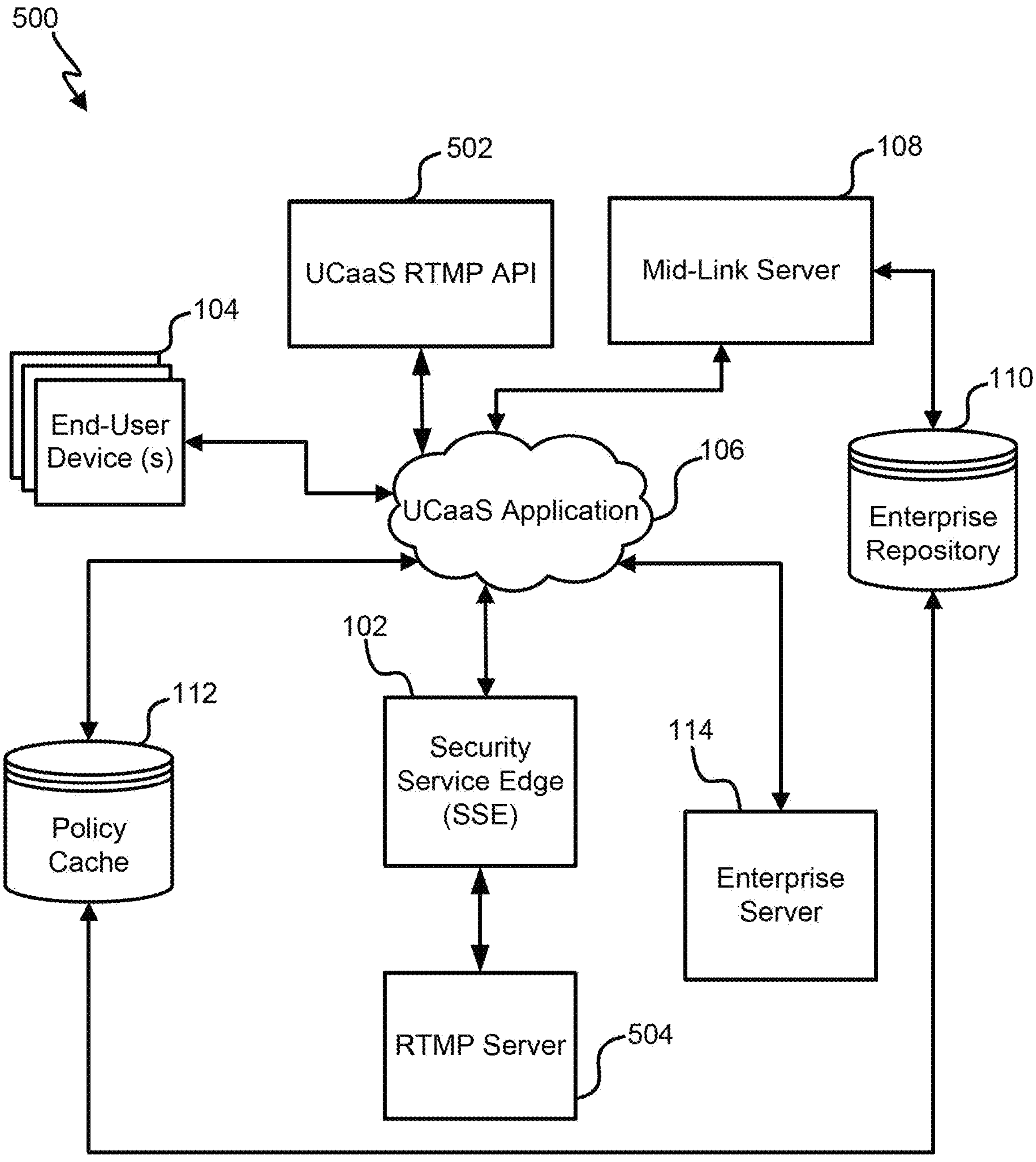
FIG. 5 illustrates a block diagram of the real-time security assistant system for the UCaaS using the SSE and a third-party application server application programming interface (API).

Referring to FIG. 5, a block diagram of a real-time security assistant system 500 for UCaaS using the SSE 102 and a third-party application server Application Programming Interface (API) is illustrated. The real-time security assistant system 500 includes the end-user device(s) 104, the UCaaS application 106, a UCaaS Real-Time Messaging Protocol (RTMP) API 502, the mid-link server 108, the enterprise repository 110, the policy cache 112, the enterprise server 114, and an RTMP server 504 hosted by the SSE 102. These components are communicatively coupled to provide near real-time deep-fake detection and policy-driven notifications.

The end-user device(s) 104 initiate live audio and video communication sessions using the UCaaS application 106. During such sessions, the UCaaS application 106 transmits media streams that is accessed externally through the UCaaS RTMP API 502. The UCaaS RTMP API 502 is provided by the UCaaS application (such as Zoom, Microsoft Teams, Google Meet) to allow third-party servers to receive real-time meeting streams.

The SSE 102 registers the RTMP server 504 as a third-party application server through the UCaaS RTMP API 502. Once registered, the UCaaS application 106 begins transmitting live video and audio streams of each session to the RTMP server 504.

RTMP server 504 forwards the received media streams to SSE 102. The SSE 102 analyzes the video and audio streams using the deep-fake detection module 402. If a deep-fake content is detected, the SSE 102 generate alerts to meeting participants via the UCaaS application 106 or notify administrators or users of the enterprise regarding the deep-fake video or audio stream.

Figure 6:
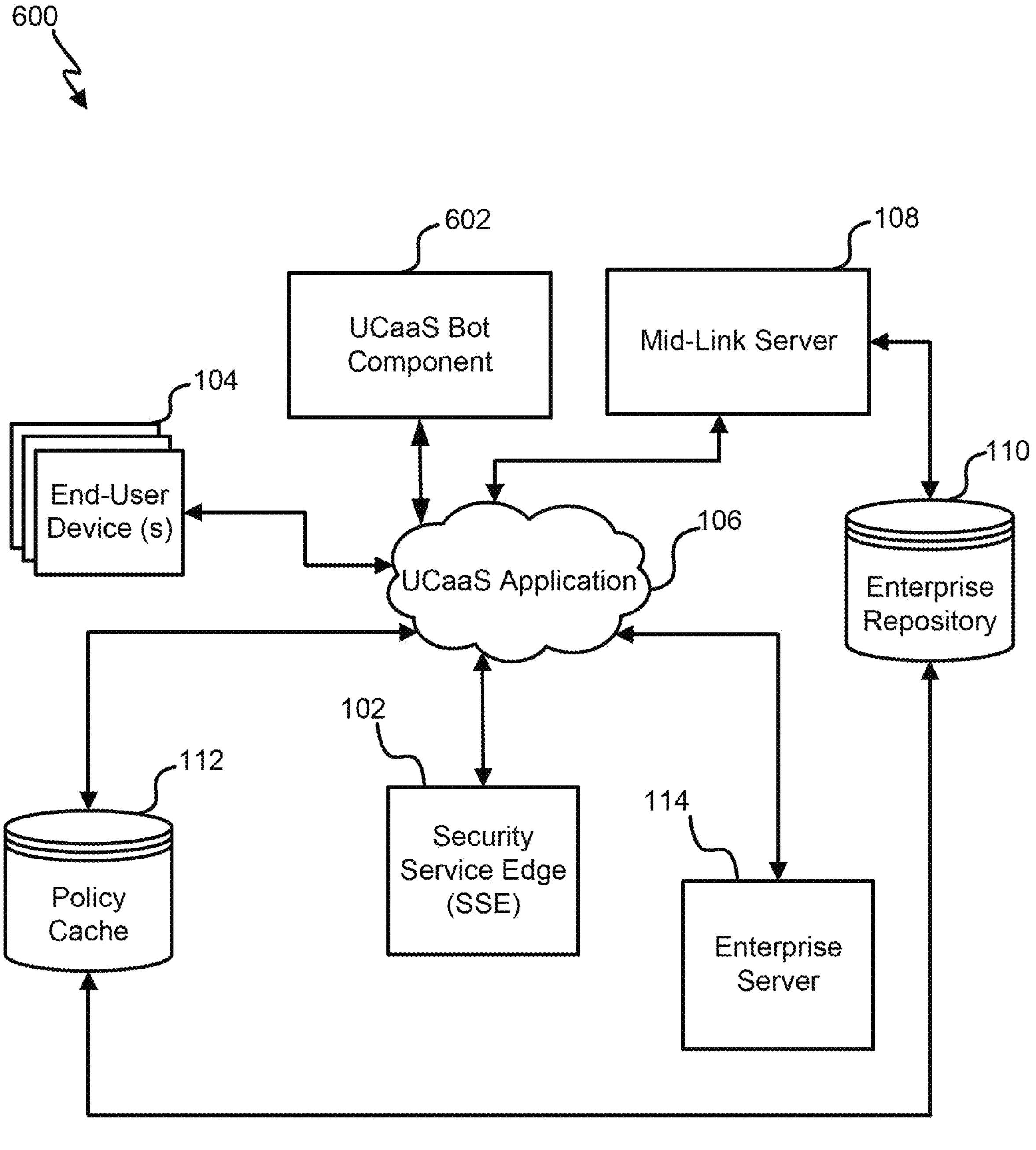
FIG. 6 illustrates a block diagram of the real-time security assistant system for the UCaaS using the SSE which includes a UCaaS bot component.

Referring to FIG. 6, a block diagram of a real-time security assistant system 600 for UCaaS using the SSE 102 and a UCaaS bot component 602 is illustrated. The real-time security assistant system 600 includes the end-user device(s) 104, the UCaaS application 106, the SSE 102, the mid-link server 108, the enterprise repository 110, the policy cache 112, the enterprise server 114, and the UCaaS bot component 602. These components are communicatively coupled to detect the deep-fake video and audio streams during live UCaaS communications and to provide alerts based on the enterprise-defined policies.

The end-user device(s) 104 establish real-time communication sessions using the UCaaS application 106. The SSE 102 is implemented at the mid-link server 108 and operates as an inline forward proxy to monitor traffic between the end-user device(s) 104 and the UCaaS application 106.

In some embodiments, in addition to inline monitoring, the SSE 102 includes the UCaaS bot component 602 to access the UCaaS application 106 through a standard UCaaS API in the same manner as a human participant joins a UCaaS communication session.

In some embodiments, the UCaaS bot component 602 joins the UCaaS communication session as a virtual participant. Through this participation, the UCaaS bot component 602 receives the same audio and video streams that are made available to other authenticated meeting attendees. The SSE 102 then receives these media streams from the UCaaS bot component 602 and performs deep-fake detection using the deep-fake detection module 402.

Upon detecting deep-fake video or audio content, the SSE 102 generate alerts to meeting participants via the UCaaS application 106 or notify administrators or users of the enterprise regarding the deep-fake video or audio stream.

In some embodiments, when the UCaaS bot component 602 is configured as the host of the UCaaS communication session, it enforces intrusive policies, such as terminating the meeting, based on detected deep-fake content.

Figure 7:
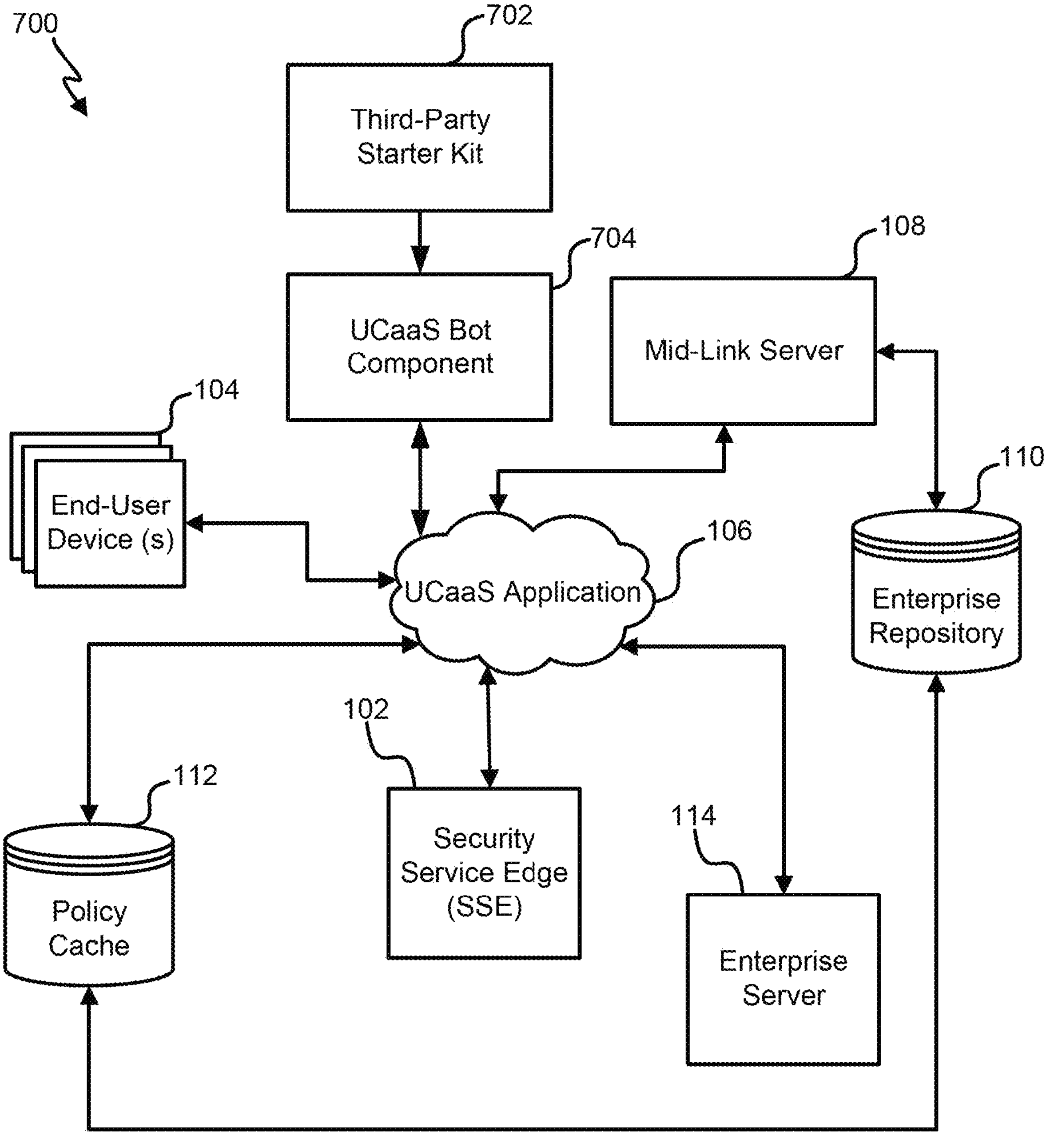
FIG. 7 illustrates a block diagram of the real-time security assistant system for the UCaaS using the SSE which includes the UCaaS bot component using a third-party starter kit.

Referring to FIG. 7, a block diagram of a real-time security assistant system 700 for UCaaS using the SSE 102 and a UCaaS bot component 704 integrated using a third-party starter kit 702 is illustrated. The real-time security assistant system 700 includes the end-user device(s) 104, the UCaaS application 106, the SSE 102, the UCaaS bot component 704, the third-party starter kit 702, the mid-link server 108, the enterprise repository 110, the policy cache 112, and the enterprise server 114. These components are communicatively coupled to detect the deep-fake video and audio streams during live UCaaS communications and to provide alerts based on the enterprise-defined policies.

In some embodiments, the third-party starter kit 702 is a UCaaS meeting bot starter kit provided by a vendor or service provider, such as recall.ai for Zoom, which simplifies bot deployment across UCaaS applications. To reduce development time and ensure compatibility across UCaaS applications, the UCaaS bot component 704 utilizes the third-party starter kit 702.

In some embodiments, the UCaaS bot component 704 joins the UCaaS communication session as a virtual participant. Through this participation, the UCaaS bot component 704 receives the same audio and video streams that are made available to other authenticated meeting attendees. The SSE 102 then receives these media streams from the UCaaS bot component 704 and performs deep-fake detection using the deep-fake detection module 402.

Upon detecting deep-fake video or audio content, the SSE 102 generate alerts to meeting participants via the UCaaS application 106 or notify administrators or users of the enterprise regarding the deep-fake video or audio stream.

In some embodiments, when the UCaaS bot component 704 is configured as the host of the UCaaS communication session, it enforces intrusive policies, such as terminating the meeting, based on the detected deep-fake content.

Figure 8:
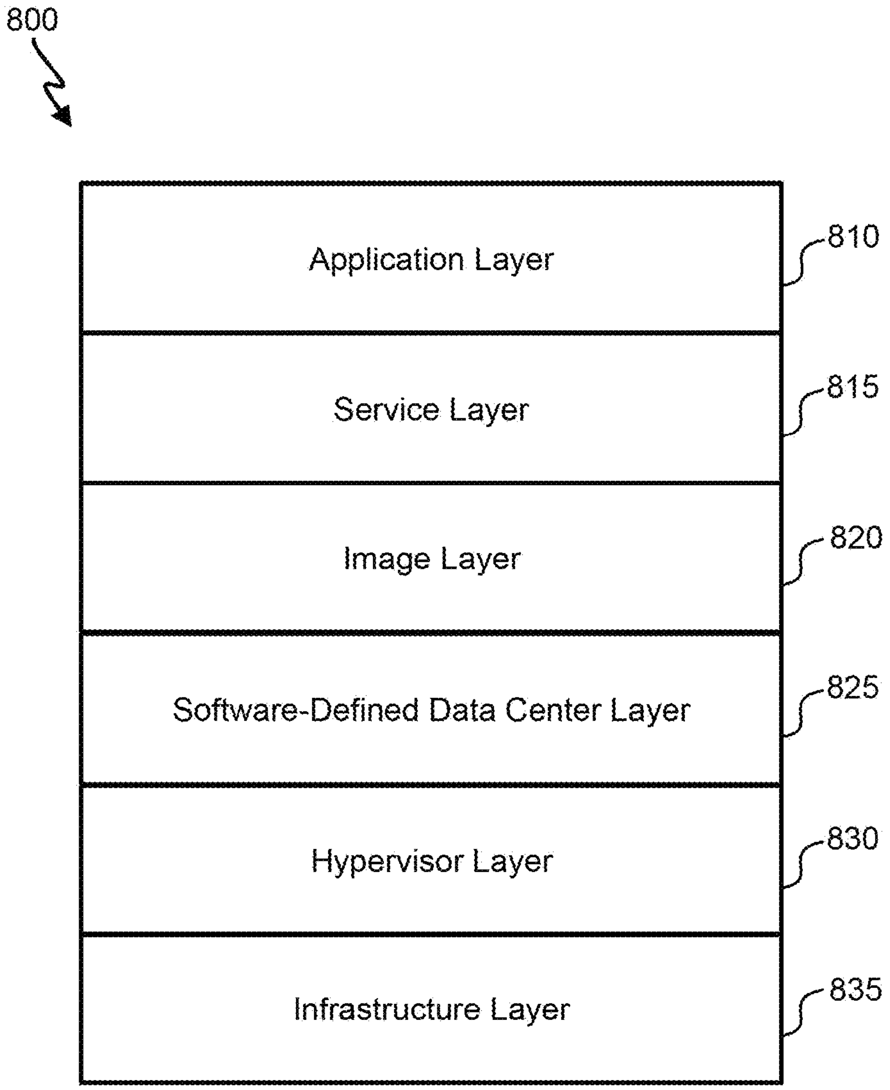
FIG. 8 illustrates a block diagram of an embodiment of an Open Systems Interconnection (OSI) model.

Referring to FIG. 8, a block diagram of an embodiment of a cloud Open Systems Interconnection (OSI) model 800 is shown. The cloud OSI model 800 for cloud computing environments partitions the flow of data in a communication system into six layers of abstraction. The cloud OSI model 800 for cloud computing environments includes, in order, an application layer 810, a service layer 815, an image layer 820, a software-defined data center layer 825, a hypervisor layer 830, and an infrastructure layer 835. The respective layer serves a class of functionality to the layer above it and is served by the layer below it. Classes of functionality is realized in software by various communication protocols.

The infrastructure layer 835 includes hardware, such as physical devices in a data center, which provides the foundation for the rest of the layers. The infrastructure layer 835 transmits and receives unstructured raw data between a device and a physical transmission medium. For example, the infrastructure layer 835 converts the digital bits into electrical, radio, or optical signals.

The hypervisor layer 830 performs virtualization, which permits the physical devices to be divided into virtual machines that bin packed onto physical machines for greater efficiency. The hypervisor layer 830 provides virtualized computing, storage, and networking. For example, OpenStack® software that is installed on bare metal servers in a data center provides virtualization cloud capabilities. The OpenStack® software provides various infrastructure management capabilities to cloud operators and administrators and utilizes the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 825 provides resource pooling, usage tracking, and governance on top of the hypervisor layer 830. The software-defined data center layer 825 enables the creation of virtualization for the Infrastructure-as-Code concept by using representational state transfer (REST) APIs. The management of block storage devices is virtualized, and end-users are provided with a self-service API to request and consume those resources, which do not entail any knowledge of where the storage is deployed or on what type of device. Various compute nodes are balanced for storage.

The image layer 820 uses various operating systems and other pre-installed software components. Patch management is used to identify, acquire, install, and verify patches for products and systems. Patches are used to correct security and functionality problems in software. Patches are also being used to add new features to operating systems, including security capabilities. The image layer 820 focuses on computing in place of storage and networking. The instances within the cloud computing environments are provided at the image layer 820.

The service layer 815 provides middleware, such as functional components that applications use in tiers. In some examples, the middleware components include databases, load balancers, web servers, message queues, email services, or other notification methods. The middleware components are defined at the service layer 815 on top of particular images from the image layer 820. Different cloud computing environment providers have different middleware components.

The application layer 810 interacts with software applications that implement a communicating component. The application layer 810 is the layer that is closest to the end-user. Functions of the application layer 810 include identifying communication partners, determining resource availability, and synchronizing communication. Applications within the application layer 810 includes custom code that makes use of middleware defined in the service layer 815.

Various features discussed above are performed at a number of layers of the cloud OSI model 800 for cloud computing environments. For example, translating the general policies into specific policies for different cloud computing environments is performed at the service layer 815 and the software-defined data center layer 825. Various scripts are updated across the service layer 815, the image layer 820, and the software-defined data center layer 825. Further, APIs and policies operate at the software-defined data center layer 825 and the hypervisor layer 830.

Respective different cloud computing environments have different service layer 815, image layer 820, software-defined data center layer 825, hypervisor layer 830, and infrastructure layer 835. Further, respective different cloud computing environments can have an application layer 810 that makes calls to the specific policies in the service layer 815 and the software-defined data center layer 825. The application layer 810 has noticeably the same format and operation for different cloud computing environments. Accordingly, developers for the application layer 810 do not entail understanding the peculiarities of how respective cloud computing environments operate in the other layers.

Figure 9:
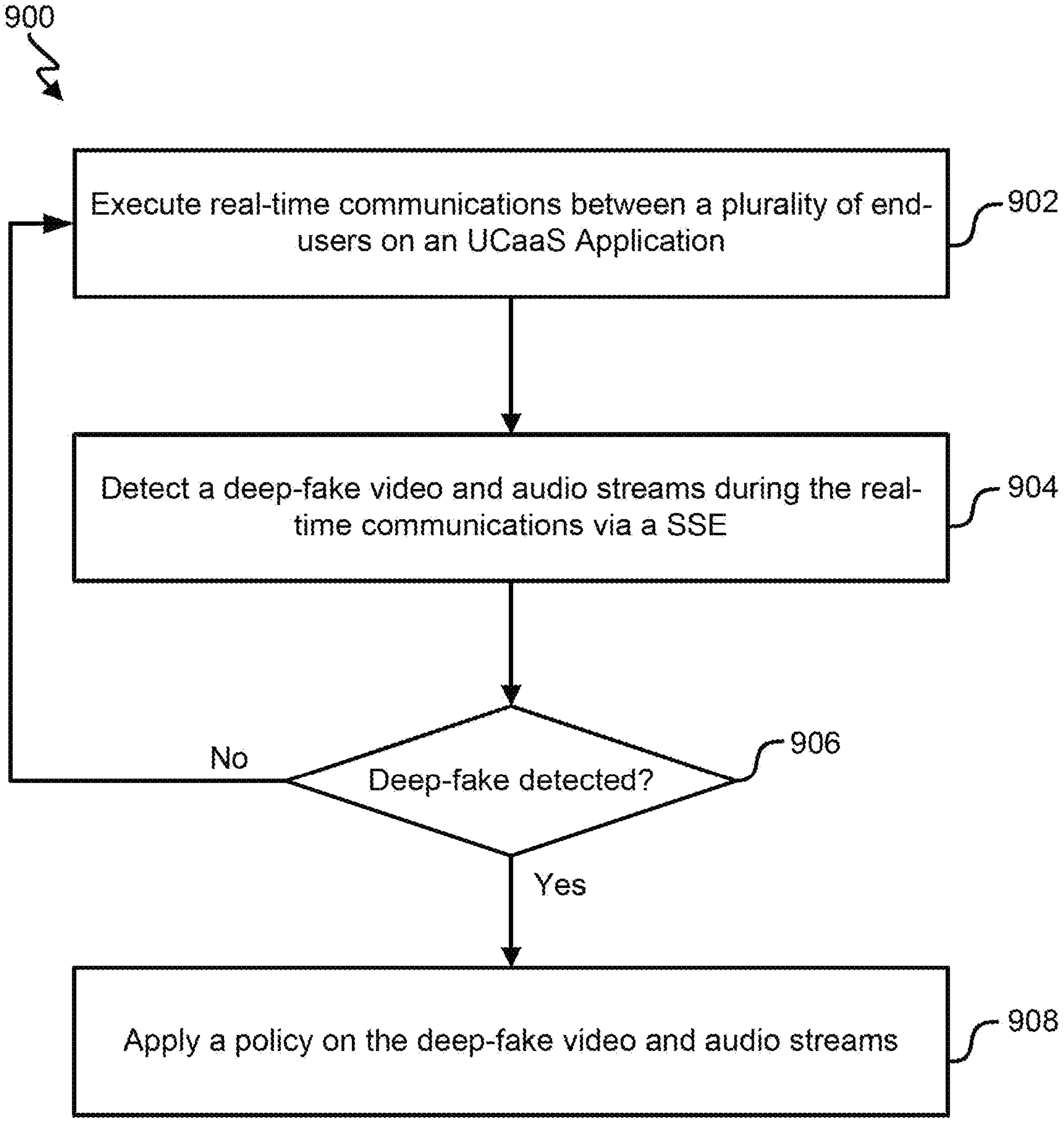
FIG. 9 illustrates a flowchart of an embodiment of providing the real-time security assistant system for the UCaaS using the SSE.

Referring to FIG. 9, a flowchart of a process 900 for providing a real-time security assistant system for UCaaS using the SSE 102 is shown.

At block 902, real-time communications are executed between several end-users using the UCaaS application 106. The real-time communications include audio streams, and video streams transmitted between the end-user device(s) 104 using the UCaaS application 106.

At block 904, the SSE 102 is used to detect deep-fake video and audio streams during real-time communications. The SSE 102 intercepts the media streams either at the mid-link server 108 through an inline forward proxy and decrypts the traffic using the forward TLS proxy 404 or the E2EE endpoint 406 of the SSE 102 as described previously.

At block 906, SSE 102 determines whether deep-fake content is detected in the video or audio streams. If no deep-fake content is detected, the process returns to block 902, and the real-time communication continues uninterrupted. If a deep fake is detected, the process proceeds to block 908.

At block 908, a policy is applied to the detected deep-fake video and audio streams. The SSE 102 retrieves the policy from the policy cache 112 or enterprise repository 110 and enforces the policy on the detected deep-fake video and audio streams.

Figure 10:
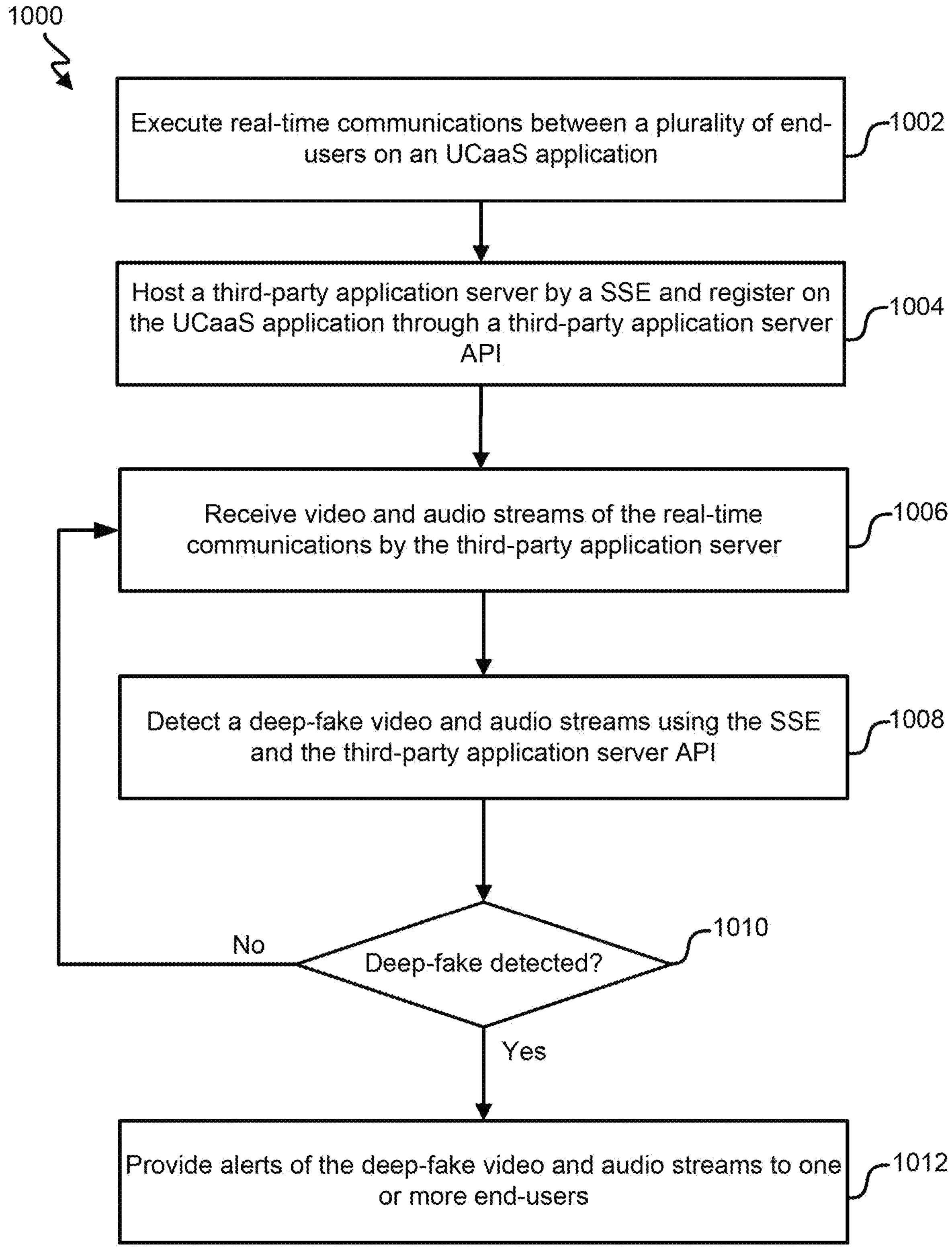
FIG. 10 illustrates a flowchart of an embodiment of providing the real-time security assistant system for the UCaaS using the SSE and the third-party application server API.

Referring to FIG. 10, a flowchart of a process 1000 for providing a real-time security assistant system for UCaaS using the SSE 102 and a third-party application server API is shown.

At block 1002, real-time communications are executed between several end-users using the UCaaS application 106. The real-time communications include audio streams, and video streams transmitted between the end-user device(s) 104 using the UCaaS application 106.

At block 1004, a third-party application server is hosted by the SSE 102 and registered on the UCaaS application 106 through a third-party application server API, such as the UCaaS Real-Time Messaging Protocol (RTMP) API 502.

At block 1006, the third-party application server, such as the RTMP server 504, receives the audio and video streams of real-time communications from the UCaaS application 106.

At block 1008, the SSE 102 detects the deep-fake video and audio streams using the third-party application server UCaaS RTMP API 502.

At block 1010, the SSE 102 determines whether the deep-fake content is detected in the video or audio streams. If no deep-fake content is detected, the process returns to block 1002, and the real-time communication continues uninterrupted. If the deep-fake content is detected, the process proceeds to block 1012.

At block 1012, the SSE 102 provides alerts of the detected deep-fake video and audio streams to end-users associated with the UCaaS application 106. The alerts are generated based on policies stored in the policy cache 112 or enterprise repository 110.

Figure 11:
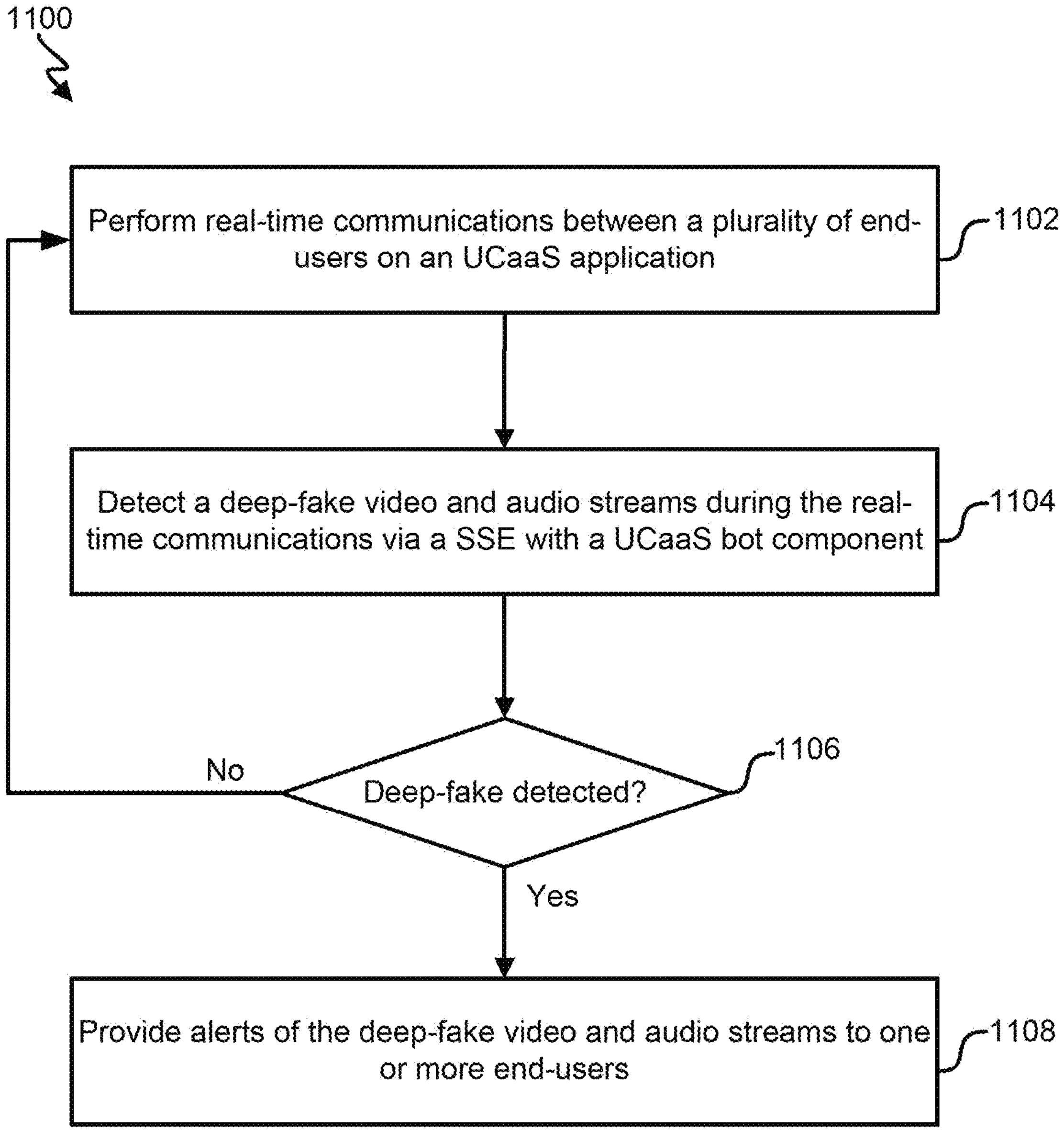
FIG. 11 illustrates a flowchart of an embodiment of providing the real-time security assistant system for the UCaaS using the SSE which includes the UCaaS bot component.

Referring to FIG. 11, a flowchart of a process 1100 for providing a real-time security assistant system for UCaaS using the SSE 102 with a UCaaS bot component 602 is shown.

At block 1102, real-time communications are performed between several end-users using the UCaaS application 106. Real-time communications include audio streams, and video streams transmitted between the end-user device(s) 104 using the UCaaS application 106.

At block 1104, the SSE 102 with the UCaaS bot component 602 is used to detect the deep-fake video and audio streams during real-time communications. The UCaaS bot component 602 joins the communication session as a virtual participant and receives the same media streams as other attendees. The received media streams are forwarded to SSE 102 to detect the deep-fake video and audio streams.

At block 1106, the SSE 102 determines whether the deep-fake content is detected in the video and audio streams. If no deep-fake content is detected, the process returns to block 1102, and the communication continues without interruption. If the deep-fake content is detected, the process proceeds to block 1108.

At block 1108, the SSE 102 provides alerts of the detected deep-fake video and audio streams to end-users associated with the UCaaS application 106. The alerts are provided based on policies stored in the policy cache 112 or the enterprise repository 110.

Figure 12:
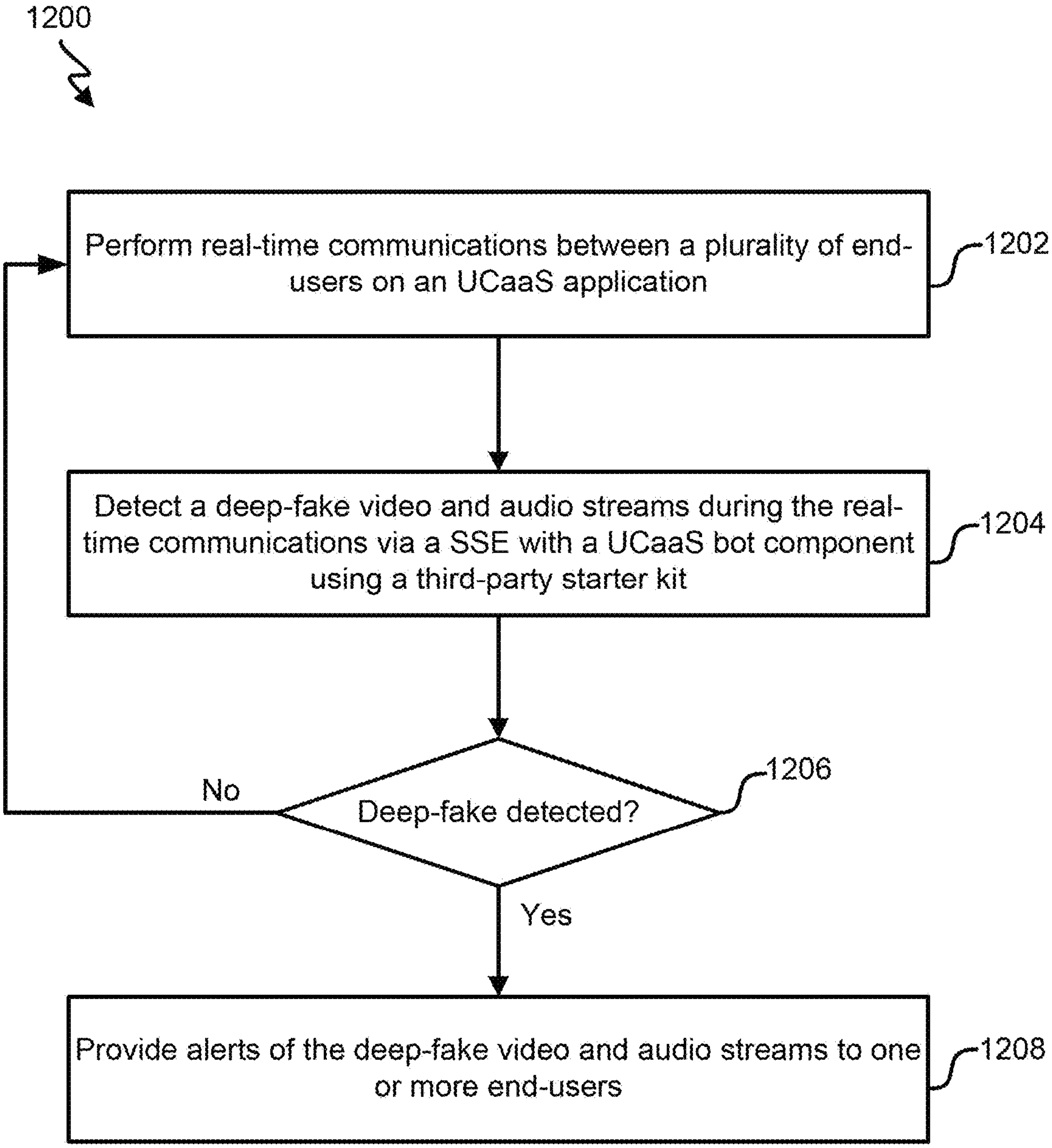
FIG. 12 illustrates a flowchart of an embodiment of providing the real-time security assistant system for the UCaaS using the SSE, which includes the UCaaS bot component using the third-party starter kit.

Referring to FIG. 12, a flowchart of a process 1200 for providing a real-time security assistant system for UCaaS using the SSE 102 with a UCaaS bot component 704 using a third-party starter kit 702 is shown.

At block 1202, real-time communications are performed between several end-users using the UCaaS application 106. The communication includes video streams and audio streams transmitted between the end-user device(s) 104 using the UCaaS application 106.

At block 1204, the SSE 102 with the UCaaS bot component 704 using a third-party starter kit 702 is used to detect deep-fake video and audio streams during real-time communications. The third-party starter kit 702 enables the UCaaS bot component 602 to join the communication session automatically and to receive the media streams in the same manner as other meeting participants.

At block 1206, the SSE 102 determines whether the deep-fake content is detected in the received video and audio streams. If no deep-fake content is detected, the process returns to block 1202, and the real-time communications continue without interruption. If the deep-fake content is detected, the process proceeds to block 1208.

At block 1208, the SSE 102 provides alerts of the detected deep-fake video and audio streams to end-users associated with the UCaaS application 106. The alerts are generated in accordance with policies retrieved from the policy cache 112 or the enterprise repository 110.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps, and means described above may be done in various ways. For example, these techniques, blocks, steps, and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

While the principles of the disclosure have been described above in connection with specific apparatuses and methods, it is to be clearly understood that this description is made only by way of example and not as limitation on the scope of the disclosure.

We claim:

1. A method for providing a real-time security assistance for a Unified Communications as a Service (UCaaS) implementing a Security Service Edge (SSE) as an inline forward proxy, the method comprising:

performing real-time communications between a plurality of end-users using an electronic agent, wherein the SSE is implemented at a mid-link server between a plurality of end-user devices and a web server associated with the electronic agent;

implementing the SSE as the inline forward proxy at the plurality of end-user devices to detect any deep-fake video and audio streams during the real-time communications;

intercepting and decrypting traffic associated with the real-time communications to access original video and audio streams from the real-time communications; and applying, in real-time, a plurality of policies on the deep-fake video and audio streams detected using the SSE, wherein:

the plurality of policies applied at the mid-link server in the application layer to selectively block the deep-fake video transmission from reaching one of the plurality of end-users according to the plurality of policies, a first policy from the plurality of policies blocks the deep-fake video transmission for a first user from the plurality of end-users, and a second policy from the plurality of policies allows the deep-fake video transmission for a second user from the plurality of end-users.

2. The method for providing the real-time security assistance for the UCaaS implementing the SSE as the inline forward proxy of claim 1, wherein the plurality of policies includes providing alerts of the deep-fake video and audio streams to one or more end-users associated with the electronic agent.

3. The method for providing the real-time security assistance for the UCaaS implementing the SSE as the inline forward proxy of claim 1, wherein intercepting and decrypting the traffic comprises intercepting and decrypting network traffic from the real-time communications using a forward Transport Layer Security (TLS) proxy to access the original video and audio streams.

4. The method for providing the real-time security assistance for the UCaaS implementing the SSE as the inline forward proxy of claim 1, further comprising:

using end-to-end encryption for encrypting the original video and audio streams; and using the SSE with an endpoint on the plurality of end-user devices to extract keys on the endpoint for performing decryption of the original video and audio streams.

5. The method for providing the real-time security assistance for the UCaaS implementing the SSE as the inline forward proxy of claim 1, wherein the electronic agent is a UCaaS application.

6. The method for providing the real-time security assistance for the UCaaS implementing the SSE as the inline forward proxy of claim 1, further comprising:

hosting a third-party application server associated with the electronic agent by the SSE and registering the third-party application server on the electronic agent through a third-party application server application programming interface (API);

receiving, by the third-party application server, video, and audio streams of the real-time communications;

detecting any deep-fake video and audio streams in the received video and audio streams using the SSE and the third-party application server API; and providing alerts of the deep-fake video and audio streams to one or more end-users associated with the electronic agent.

7. A method for providing a real-time security assistance for a UCaaS through a UCaaS bot component, the method comprising:

performing real-time communications between a plurality of end-users using an electronic agent, wherein a SSE is implemented at a mid-link server between a plurality of end-user devices and a web server associated with the electronic agent;

implementing the SSE as an inline forward proxy at the plurality of end-user devices, wherein the SSE includes the UCaaS bot component to access the electronic agent and retrieve original video and audio streams from the real-time communications;

detecting any deep-fake video and audio streams using the SSE via the UCaaS bot component; and selectively providing alerts of the deep-fake video and audio streams to a first end user of the plurality of end-users associated with the electronic agent when dictated by a policy applied at the mid-link server in the application layer of the UcaaS, but not a second end user of the plurality of end-users associated with the electronic agent when dictated by the policy.

8. The method for providing the real-time security assistance for the UCaaS through the UCaaS bot component of claim 7, wherein, if the UCaaS bot component is configured as a host of the real-time communications on the electronic agent, the UCaaS bot component applies a plurality of policies on the detected deep-fake video and audio streams, and wherein the plurality of policies includes terminating the real-time communications.

9. The method for providing the real-time security assistance for the UCaaS through the UCaaS bot component of claim 7, the method further comprising detecting, by the SSE, the deep-fake video and audio streams in the original video and audio streams using the UCaaS bot component and a third-party starter kit, wherein the SSE includes the UCaaS bot component using the third-party starter kit of the electronic agent to access the electronic agent and retrieve the original video and audio streams from the real-time communications.

10. A real-time security assistant system for UCaaS implementing a SSE as an inline forward proxy, the system comprising:

one or more processors, and a memory coupled with the one or more processors, wherein the memory stores instructions that, when executed by the one or more processors, cause the one or more processors to:

perform real-time communications between a plurality of end-users using an electronic agent, wherein the SSE is implemented at a mid-link server between a plurality of end-user devices and a web server associated with the electronic agent;

implement the SSE as the inline forward proxy at the plurality of end-user devices to detect any deep-fake video and audio streams during the real-time communications;

intercept and decrypt traffic associated with the real-time communications to access original video and audio streams from the real-time communications; and apply, in real-time, a plurality of policies on the deep-fake video and audio streams detected using the SSE, wherein:

the plurality of policies applied at the mid-link server blocks the deep-fake video transmission from reaching one of the plurality of end-users according to the plurality of policies, and the plurality of policies applied at the mid-link server allows the deep-fake transmission to pass to another one of the plurality of end-users according to the plurality of policies.

11. The real-time security assistant system of claim 10, wherein the plurality of policies includes providing alerts of the deep-fake video and audio streams to one or more end-users associated with the electronic agent.

12. The real-time security assistant system of claim 10, wherein the one or more processors intercept and decrypt the traffic by:

intercepting and decrypting network traffic from the real-time communications using forward Transport Layer Security (TLS) proxy to access the original video and audio streams.

13. The real-time security assistant system of claim 10, the instructions that when executed by the one or more processors further cause the one or more processors to:

use end-to-end encryption for encrypting the original video and audio streams; and use the SSE with an endpoint on the plurality of end-user devices to extract keys on the endpoint for performing decryption of the original video and audio streams.

14. The real-time security assistant system of claim 10, wherein the electronic agent is a UCaaS application.

15. The real-time security assistant system of claim 10, the instructions that when executed by the one or more processors further cause the one or more processors to:

host a third-party application server associated with the electronic agent by the SSE and registering the third-party application server on the electronic agent through a third-party application server application programming interface (API);

receive, by the third-party application server, video, and audio streams of the real-time communications;

detect any deep-fake video and audio streams in the received video and audio streams using the SSE and the third-party application server API; and provide alerts of the deep-fake video and audio streams to one or more end-users associated with the electronic agent.

16. The real-time security assistant system of claim 10, the instructions that, when executed by one or more processors, further cause the one or more processors to detect the deep-fake video and audio streams using the SSE via a UCaaS bot component, wherein the SSE includes the UCaaS bot component to access the electronic agent and retrieve the original video and audio streams from the real-time communications.

17. The real-time security assistant system of claim 16, wherein, if the UCaaS bot component is configured as a host of the real-time communications on the electronic agent, the UCaaS bot component applies the plurality of policies on the detected deep-fake video and audio streams, and wherein the plurality of policies includes terminating the real-time communications.

18. The real-time security assistant system of claim 16, the instructions that, when executed by one or more processors, further cause the one or more processors to detect, by the SSE, the deep-fake video and audio streams in the original video and audio streams using the UCaaS bot component and a third-party starter kit, wherein the SSE includes the UCaaS bot component using the third-party starter kit of the electronic agent to access the electronic agent and retrieve the original video and audio streams from the real-time communications.

19. A non-transitory computer-readable storage medium having stored thereon instructions for causing at least one computer to execute a method for providing real-time security assistance for UCaaS implementing a SSE as an inline forward proxy, the method comprising:

performing real-time communications between a plurality of end-users using an electronic agent, wherein the SSE is implemented at a mid-link server between a plurality of end-user devices and a web server associated with the electronic agent;

implementing the SSE as the inline forward proxy at the plurality of end-user devices to detect any deep-fake video and audio streams during the real-time communications;

intercepting and decrypting traffic associated with the real-time communications to access original video and audio streams from the real-time communications; and applying, in real-time, a plurality of policies on the deep-fake video and audio streams detected using the SSE, wherein:

the plurality of policies applied at the mid-link server selectively blocks the deep-fake video transmission from reaching one of the plurality of end-users according to the plurality of policies, a first policy from the plurality of policies blocks the deep-fake video transmission for a first user from the plurality of end-users, and a second policy from the plurality of policies allows the deep-fake video transmission for a second user from the plurality of end-users.

20. The non-transitory computer-readable storage medium of claim 19, wherein the method further comprises detecting the deep-fake video and audio streams using the SSE via a UCaaS bot component, wherein the SSE includes the UCaaS bot component to access the electronic agent and retrieve the original video and audio streams from the real-time communications.

* * * * *